(12) United States Patent
Alvin

(10) Patent No.: US 8,396,743 B2
(45) Date of Patent: Mar. 12, 2013

(54) SENDING TARGETED PRODUCT OFFERINGS BASED ON PERSONAL INFORMATION

(76) Inventor: Robert S. Alvin, Boulder Creek, CA (US)

( * ) Notice: Subject to any disclaimer, the term of this patent is extended or adjusted under 35 U.S.C. 154(b) by 0 days.

(21) Appl. No.: 13/401,827

(22) Filed: Feb. 21, 2012

(65) Prior Publication Data

US 2012/0150593 A1 Jun. 14, 2012

Related U.S. Application Data

(60) Division of application No. 12/589,645, filed on Oct. 26, 2009, now Pat. No. 8,374,956, which is a continuation of application No. 11/603,282, filed on Nov. 20, 2006, now abandoned, which is a continuation of application No. 09/343,550, filed on Jun. 30, 1999, now Pat. No. 7,139,731.

(51) Int. Cl.
*G06Q 40/00* (2012.01)

(52) U.S. Cl. ....... 705/14.1; 705/26.1; 705/38; 705/7.25; 705/1.1; 705/27.1

(58) Field of Classification Search ............... 705/1.1, 705/14.1, 26.1, 38, 7.25, 50, 80, 59, 27.1, 705/34; 709/221, 223, 224; 235/380; 715/853, 715/855
See application file for complete search history.

(56) References Cited

U.S. PATENT DOCUMENTS

| | | | |
|---|---|---|---|
| 5,742,931 A | 4/1998 | Spiegelhoff et al. | |
| 6,141,653 A | 10/2000 | Conklin et al. | |
| 6,460,020 B1 | 10/2002 | Pool et al. | |
| 6,754,636 B1 | 6/2004 | Walker et al. | |
| 7,580,856 B1 * | 8/2009 | Pliha .......................... | 705/14.26 |

OTHER PUBLICATIONS

PurchaseSoft Procurement Intelligence, "Cashing in on e-commerce"; Year 2000, PurchaseSoft, Inc., Inc.*

* cited by examiner

*Primary Examiner* — John H Holly

(57) ABSTRACT

Targeted products are offered over a communications network. Product data for a plurality of products from a plurality of distributors for the products is received. Customer data from a plurality of customers comprising personal information about customers is received. Using the data, at least one user-specific product offering from the plurality of products is generated. Automated messages comprising the at least one user-specific product offering to the one or more customers are then sent.

20 Claims, 5 Drawing Sheets

SENDING TARGETED PRODUCT OFFERINGS BASED ON PERSONAL INFORMATION

RELATED APPLICATIONS

This application is divisional of U.S. application Ser. No. 12/589,645, filed Oct. 26, 2009 now U.S. Pat. No. 8,374,956, which is a continuation of U.S. application Ser. No. 11/603,282, filed Nov. 20, 2006, now abandoned, which is a continuation of U.S. application Ser. No. 09/343,550, filed Jun. 30, 1999, now issued as U.S. Pat. No. 7,139,731.

TECHNICAL FIELD

The present invention relates to business transactions conducted over the Internet and in particular to a transaction processor to conducting the same.

BACKGROUND

Traditionally, commodities such as computer related products, for example, have been sold primarily through retail stores and catalogs and, more recently, through telephone sales supported by infomercials and other print and media advertising. However these traditional models for selling computer related products suffer significant disadvantages.

Store-based retailers have limited shelf space due to costly inventory and real estate investment considerations. This limits the number of products store-based retailers can offer to their customers. Also, the personnel required to operate stores are expensive and can be difficult to hire and train. The physical store's need for personnel also limits the flexibility and efficiency of the sales process. The number of customers that can be served and the quality of service is dependent on the number of personnel dedicated to the sales process.

Store-based retailers also face the financial risk of carrying inventory that may quickly become obsolete. Physical possession of inventory also limits the speed at which these retailers can change their merchandise mix and offer new products. This is because a store must physically obtain, set up and display the products. Physical stores also can only serve customers in a limited geographic area because the customers must travel to the store to shop. To extend this limited reach, new stores must be opened in different geographic locations. However, the time required and the significant investments in inventory, real estate and personnel required at each new location, make it difficult to expand quickly into new geographic regions.

Catalog-based (e.g., mail-order) retailing provides only a partial solution to the disadvantages of store-based retailing. Catalogs do provide customers with the convenience of shopping from home or the office at flexible times. However, catalog merchandising is costly and wasteful because paper, printing, and postage are increasingly expensive and a large percentage of people to whom catalogs are sent will not use them. Also, the number of products catalogs can feature and the product information they can provide are limited due to catalog mailing, printing and other related expenses.

Catalogs are also very inflexible and provide only limited accessibility. In order to change products or prices, the catalog must be reprinted and redistributed which is both costly and time consuming. Furthermore, catalogs' accessibility is limited in that they are available only to those people to whom they are sent. Also, the catalog shopping experience is, in general, neither interactive nor personalized, yet requires extensive personnel support and manual intervention on behalf of the retailer to take and process orders.

The more recent advent of the combination of infomercials and other advertising supporting telephone sales also provides only a partial solution. The ability to order by phone provides the same inconvenience that the catalog does. However, infomercial and other advertising is extremely expensive. They are also limited in their geographic scope. Typical media outlets serve only a relatively small geographic area. To expand the geographic scope of advertising, additional media outlets in different locations must be used. This greatly increases expenses. Advertising is also limited in duration. Expense increases drastically upon extending the term of the advertising.

The advertisements and infomercials that describe the products are also limited in the scope of products they can cover. The expense limits the size of print advertising and the duration of radio and television advertising. These limitations restrict the number of products that can be covered. They also restrict the amount of information that can be provided for the products.

Recently, the Internet has emerged as a powerful new global communications and commerce medium that represents a radical new way for people to share information and conduct business electronically. Though the Internet has been well known for several years, it has been mainly used for research and as an educational medium. Hence people were initially slow to adopt it as a common means of conducting retail commerce. However, with technology advancing such that personal computers are now an affordable commodity for the average household, more and more personal computers are being acquired for home usage. In conjunction with increased computer awareness and usage, affordability and ease of accessibility to the Internet from an average household has given birth to a new type of commercial medium referred to as Electronic Commerce (i.e., E-Commerce).

The increasing functionality, accessibility and overall usage of the Internet have made it an attractive commercial medium that can offer solutions to many of the shortcomings of the traditional retail models. For instance, the Internet has radically changed the relationship between customers. Online retailers can, from a single remote computer, interact directly and simultaneously with customers across the globe.

The Internet also eliminates the traditional retail models' limited availability and barriers to expansion. On the Internet, a store is accessible throughout the world around the clock. The limitations associated with printed catalogs are eliminated as well. There is no incremental cost associated with making Internet content available to people who will not use it. Internet also provides easy adaptability to changing market conditions and allowing an interactive, customizable retail experience.

Online retailers can respond more rapidly to customer demand by frequently modifying their product offerings, shopping interfaces and pricing, simply by modifying their Web site. Additionally, the Internet improves on the limited amount of information that can be conveyed in the catalog and advertising/telephone sales models of retail sales. Web sites are inexpensive relative to the number of potential customers they reach, allowing much more information can be provided on a Web site than in any advertisement.

However, even with the advantages that are associated with the usage of the Internet as a commercial medium, there are still drawbacks in the currently existing E-Commerce retail businesses. In particular, most E-Commerce retail businesses mainly use the Internet and Web pages as an advertising medium to replace the previous catalog/infomercial type advertisements. Although some of the businesses have begun accepting product orders online via email or Web pages, the current E-Commerce businesses for the most part have adopted a hybrid business model in which the traditional business models are coupled with E-Commerce business practices.

For instance, the usage of the Internet has replaced a few of the traditional business practices such as advertising and order processing, but most of the so-called E-Commerce retail businesses of the prior art still operate by maintaining an inventory. That is to say, the current online businesses still maintain inventories in warehouses that store the merchandise to be sold. As described above, the costs associated with such business practices are high, especially in the computer related products market where their relatively short life cycle and the rapid adoption of new technologies and products make the traditional inventory store and catalog sales models particularly problematic. If the computer products are not sold in a relatively short period of time, the unsold merchandise will become obsolete due to the fast pace in which technology is evolving.

Furthermore, some of the prior art E-Commerce systems are prone to unnecessary down-time due to dependence of out-sourced services resulting in loss of sales during the down-time period. In particular, the primary use of credit cards as the preferred method of payment over the Internet has made checking for credit card fraud a necessity. To that end, almost all E-Commerce businesses are connected to a financial service center for processing fraud checks. However, if the connection to the service center is down for any reason, process of sales is halted until a fraud check can be performed. Additionally, most E-Commerce businesses rely exclusively on the results of the commercially available fraud check institutions. If the criteria set by the fraud check institution are too high, then sales that would otherwise have been profitable are lost.

SUMMARY

The above-mentioned needs are met with a method, a computer program product, and a system for targeted product offerings.

Targeted products are offered over a communications network. Product data for a plurality of products from a plurality of distributors for the products is received. Customer data from a plurality of customers comprising personal information about customers is received. Using the data, at least one user-specific product offering from the plurality of products is generated. Automated messages comprising the at least one user-specific product offering to the one or more customers are then sent.

Additional objects, advantages and novel features of the invention will be set forth in the description which follows or may be learned by those skilled in the art through reading these materials or practicing the invention. The objects and advantages of the invention may be achieved through the means recited in the attached claims.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION

Figure 1:
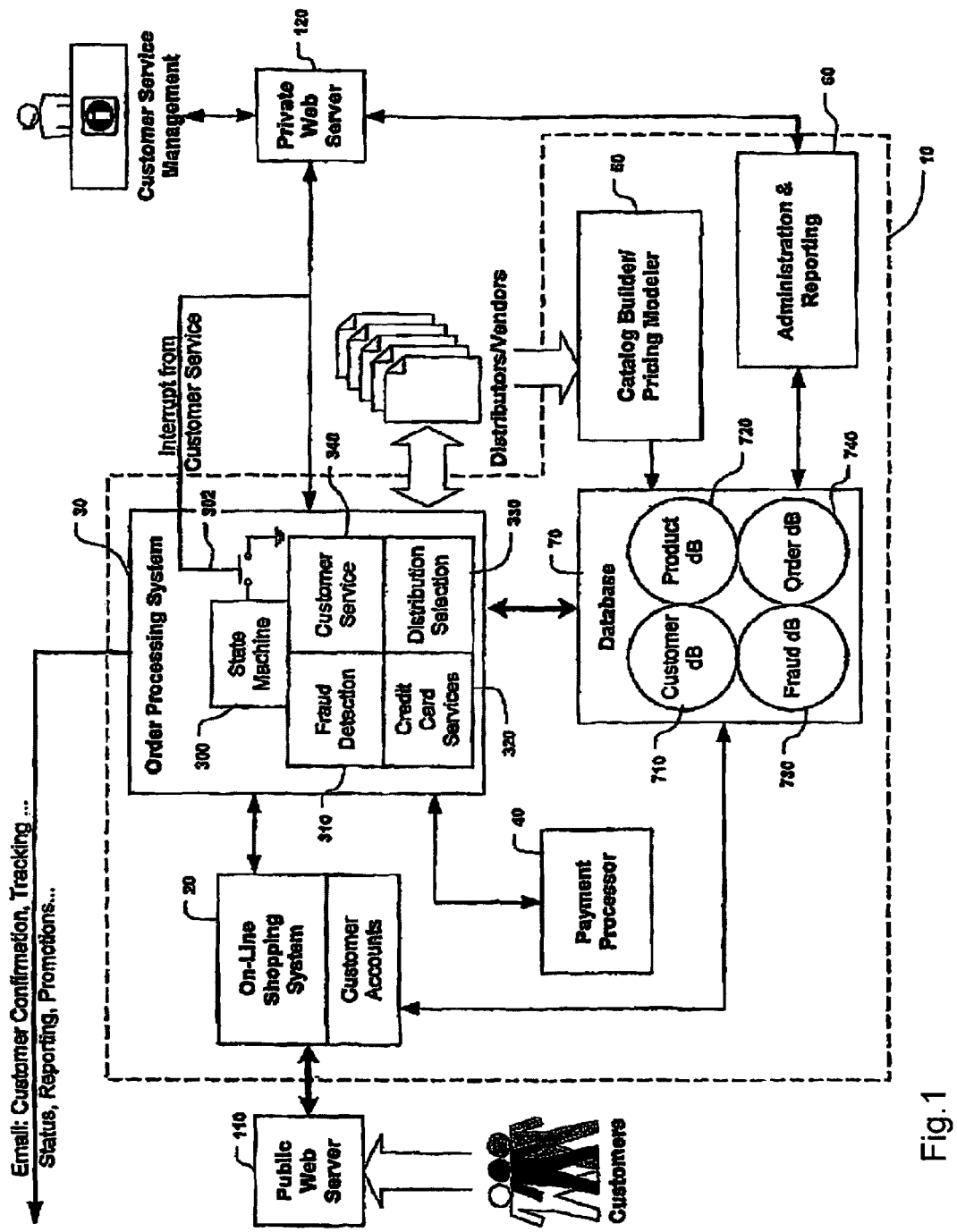
FIG. 1 is a block diagram showing the overall system of the present invention.

Using the drawings, the preferred embodiments of the present invention will now be explained. As shown in FIG. 1, the Internet business transaction processor 10 of the present invention has a distributed processing design allowing the processing load to be distributed among multiple parallel servers. The Internet business transaction processor according to the present invention is comprised of an Online Shopping System 20, Order Processing System 30, Payment Processing System 40, Catalog Builder/Price Modeler 50, and Administration System 60. The transaction processor 10 of the present invention also includes a main database 70 comprised of a Customer Database 710, Products Database 720, Fraud Database 730, and Order Database 740.

According to the present invention, a customer accesses the Online Shopping System 20 via a public Web server 110 to obtain product information available for purchases, set up a customer account, check order status, etc. The Order Processing System 30 receives the product order requests and processes the orders to check for availability with multiple distributors, orders the products based on pricing information, performs credit card validations, etc. The Payment Processing System 40 processes the method of payment once the orders have been properly processed. The Catalog Builder/Price Modeler 50 builds information of the products offered by the distributors to be made available by the Online Shopping System 20 to the customer as well as the prices at which these products will be offered based on a pricing model to be described in detail below. Customer service representatives and managers have access to all of the information in the database via the Administration System 60 through a dedicated secure Web server 120 available only to authorized personnel. The Administration System 60 is used to produce reports of sales, reconcile order discrepancies, manually adjust prices, approve credit, etc. Functionality of each of the sub-systems will now be explained in detail.

Online Shopping System

The Online Shopping System 20 is the main interface between the customer and the E-Commerce business and is primarily responsible for providing the overall online shopping experience to the customer. The Online Shopping System 20 of the present invention provides an electronic catalog of available products stored in the Products Database 720 along with the price of the product. This information is generated by the Catalog Builder/Price Modeler 50 to be descried in detail below.

The electronic catalog is a Web page, for example, that dynamically displays product information from the Products Database 720. Consequently, the electronic catalog is always up to date with the most recent product information and does not suffer from the same shortcomings as that of the prior art cataloging systems. Furthermore, because each product is displayed as a dynamic variable, a new catalog does not have to be generated every time the Product Database 70 is updated. Only the updated product information will be changed in the catalog.

In conjunction with the electronic catalog, the Online Shopping System 20 provides an electronic shopping cart that keeps record of each item marked to be purchased by the customer and provides a finalized shopping list and the total amount purchased at the end of a shopping session which may include appropriate taxes and shipping/handling charges.

The Online Shopping System 20 is also used to create customer accounts with such information as customer name, billing address, telephone number, email address, etc. and this information is stored in the Customer Database 710. Such information is used by the transaction processor 10 for billing, order notification, promotional/incentive distribution, etc. A customer may also access the Online Shopping System 20 to track the status of previous orders and returned merchandise, send inquiries to Customer Service, etc. Furthermore, customer accounts can be used to generate customized portfolios based on purchase patterns of individuals to provide targeted advertising, purchase incentives such as electronic coupons and rebates, specialized promotions and competitive pricing of high demand products.

Catalog Builder/Price Modeler

As described generally above, the Catalog Builder/Price Modeler 50 builds the Products Database 720 with available products from the distributors as well as the sales price for each product. With regard to the catalog generation, the Catalog Builder/Price Modeler 50 receives product information from multiple distributors. The product information includes but are not limited to product description, quantity available, and price for the product.

Access to the product information from the distributors may be accomplished by Telnet, FTP (File Transfer Protocol), industry standard EDI (Electronic Data Interchange), or any other appropriate communication protocol including specialized client/server software provided used by the distributors.

Downloading of the product information from the distributors is scheduled to run automatically by the Catalog Builder/Price Modeler 50 so that no human interaction is necessary unless it is desired to do so. The product information is preferably updated continually throughout the day as updated product information becomes available from the distributors or based on other preselected triggers. For example, all the distributor data may be updated during certain times of the day. Data for some selected distributors may be updated hourly while product data of others may be updated every time the web page is viewed for that product or after the product is ordered. As the communications technology becomes more advanced, it may be possible to maintain a continuous connection to the distributors' network thereby obtaining real-time status of each product offered by the distributor.

For other suppliers of products that may not have such communication capabilities or does not make economic sense to provide such continuous update of product information, an alternative system may be provided for updating/accessing product information. For instance, small distributors or individual vendors may operate through a secure web site to update their product information, receive order information from the transaction processor of the present invention, and provide shipping/tracking information of their products from their companies.

Once the product information from each of the distributors is collected, the Catalog Builder/Price Modeler 50 sorts the product information to generate the electronic catalog. The Catalog Builder/Price Modeler 50 of the present invention generates multiple catalogs from the same system and allows the Online Shopping System 20 to dynamically display user specific interfaces. The Catalog Builder/Price Modeler 50 generates catalogs with different visual presentations (e.g., color, fonts, graphics, advertising, etc.) and product offerings depending on the user accessing the Online Shopping System 20 based on the user-specific information via criteria-specific templates.

For example, when a student accesses the Online Shopping System 20 of the present invention as a potential customer, the Online Shopping System 20 displays a catalog of mixed products appropriate for students with academic pricing. Alternatively, a business person who accesses the Online Shopping System 20 of the present invention may see a catalog of products appropriate for his or her business with available corporate discounts for that product. This way, a single system is maintained that looks and functions like many different catalog shopping systems.

The pricing model used by the Catalog Builder/Price Modeler 50 of the present invention is an intelligent rule-based algorithm such as an AI (i.e., Artificial Intelligence) program generates a competitive price for a product based on price of the product offered from the distributors, any specials that are being promoted for the product, and cost/profit margins from the sale of the product to the customer. Simply stated, the price of the product is a function of the profit margin. Default margins are set in the rule-based programming of the pricing model, but due to its adaptability the Catalog Builder/Price Modeler 50 may automatically adjust the margins based on the rules of the pricing model and the pricing information obtained from the distributors. Further, the rules of the pricing model and setting of margins may be manually modified using the Administration System 60 to be explained in detail below.

The Catalog Builder/Price Modeler 50 of the present invention uses a plurality of margins to determine the sales price of a product depending on which category the product is in. For instance, the margin for the products in the first category may be set to 10%+cost since this is a category of products that the customer would most likely buy even though the price may be a little bit high. On the other hand, the margin for the products in the second category may be set to 2.5%+cost in order to provide a competitive price for high demand products. Further, the margin for the products in the third category may be set to 0%+cost due to promotionals of discontinued products, for example.

The Catalog Builder/Price Modeler 50 may be used to obtain initial sale prices of the products to be listed in the electronic catalog. Furthermore, the Catalog Builder/Price Modeler 50 may also adjust the pricing dynamically based on other system data that may change throughout the day. For example, the price may be adjusted based on the amount of web site traffic, sales for a particular vendor, category, or SKU, and even the time of day. Subsequently, the Catalog Builder/Price Modeler 50 may be used in conjunction with the Order Processing System 30 to be described in detail hereinafter to select a distributor to fill the order for a selected product using real-time data at the time of purchase. In this way, prices of the products in the electronic catalog can be dynamically changed based on the current market for these products.

Order Processing System

The Order Processing System 30 of the present invention processes the orders passed from the Online Shopping System 20. The Order Processing System 30 of the present invention is comprised of four basic sub-systems: Fraud Detection 310, Credit Card Services 320, Distributor Selection 330, and Customer Service 340. The overall functionality of the Order Processing System 30 is described hereinafter.

When an order for a selected product is received, the Order Processing System 30 first determines whether the order is a valid order by the Fraud Detection sub-system 310. If the order is valid, then the order is sent to the Distributor Selection sub-system 330 to determine firstly if the product ordered is available and secondly from which distributor the product will be supplied. Once a distributor is chosen the order is fulfilled with the distributor. After confirmation of product shipment, the order is sent to the Payment Processing System 40 via the Credit Card Services sub-system 320 to charge the customer's credit card for the purchase. The Customer Service sub-system 340 monitors each of the ordering processes and can intervene anywhere in the process if warranted.

Figure 2:
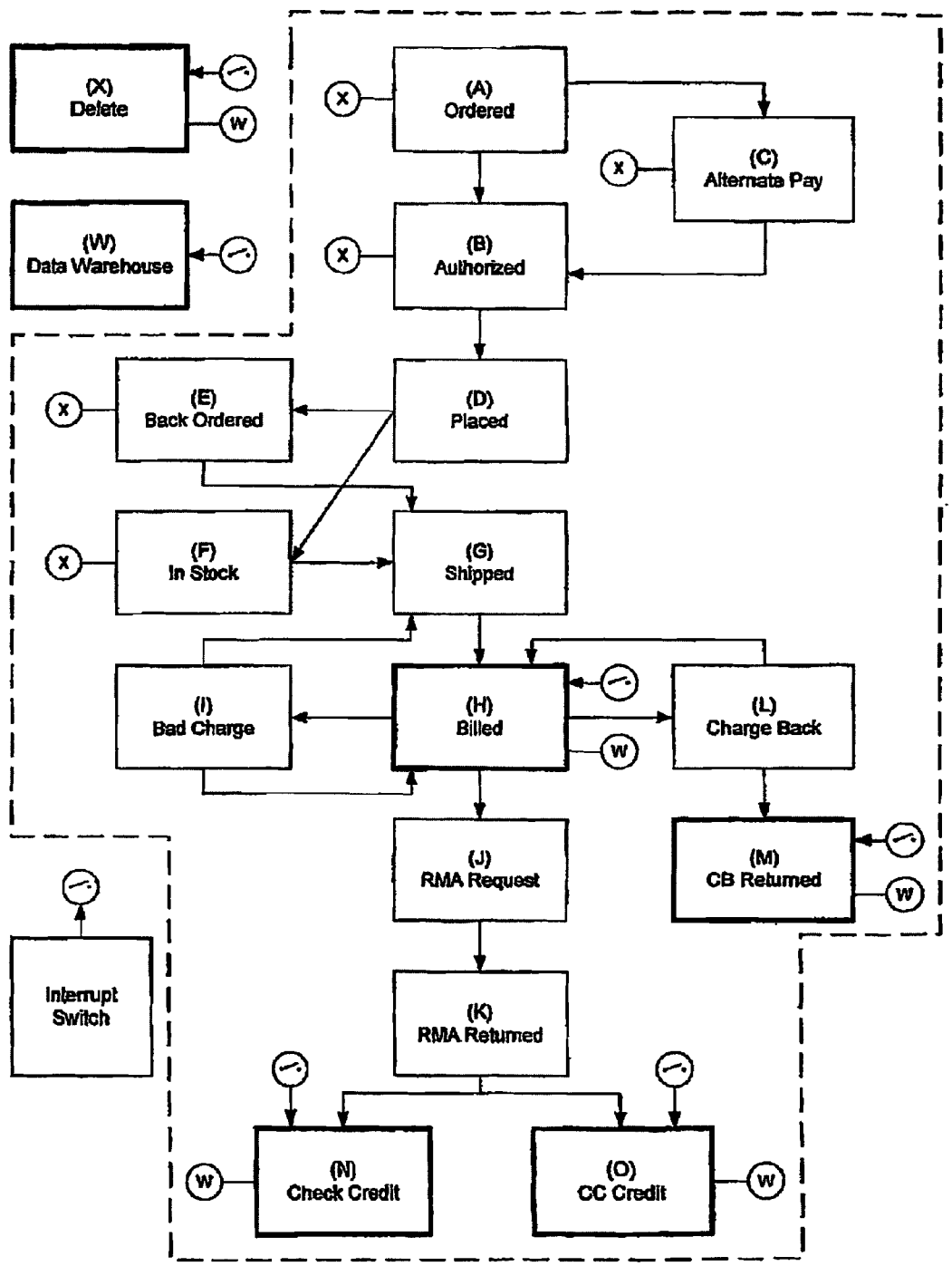
FIG. 2 is a state diagram of the order processing of the present invention.

Moreover, the Order Processing System 30 of the present invention is driven as a state machine 300. As such, a purchase order during processing enters predetermined states as shown in FIG. 2. Interrupt switch 302 is operable to interrupt state machine 300 to facilitate selective tracking of an order during processing to determine the status of any purchase order during processing. The intervention of the state machine 300 also allows the ability to force an order into a particular state or manually set certain flags by hand. As such, the state machine 300 of the present invention allows enhancements to the state diagram for manageable changes to the Order Processing System 30. Additions or deletions of new states, arcs, and conditions change the paths an order takes through the order processing operation. As will be hereinafter more fully explained, a purchase order during processing under control of state machine 300 can only come to rest at a predetermined number of processing stations or states (e.g., H, M, N, O, X, etc.) as shown in FIG. 2.

Each block represents a state in which a purchase order being processed by the Order Processing System 30 can occupy. According to the present invention, a purchase order being processed by the Order Processing System 30 must move from one state to the other except in the states indicated in bold, e.g., states (H), (M), (N), (O), (X), and (W). These are the only states according to the present invention in which a purchase order can be at rest at a final destination. All other states are transient and the order will eventually move to the next state, or eventually flagged with an error condition which triggers an alarm to customer service indicating an abnormality in the order processing. For example, an order that has been placed for a product in stock but never shows up as being shipped (i.e., stuck in the "in-stock" state) times out after a predetermined time period and is flagged as an error. With the Order Processing System 30 of the present invention functioning as a state machine as described above, a purchase order can only be in predetermined states at any given time thereby facilitating ease of tracking of the status of an order.

A detailed description of each of the sub-systems is provided hereinafter.

Multi-Level Fraud Detection

The Fraud Detection sub-system 310 of the present invention is a multi-level fraud checking system used to determine if an order is a valid order. As shown in FIG. 1, when an order is passed from the Online Shopping System 20, the Order Processing System 30 receives the order information such as credit card information, billing address, shipping address, quantity of selected products, sales prices of the products, etc. This order information is initially passed through the Fraud Detection sub-system 310.

Figure 3:
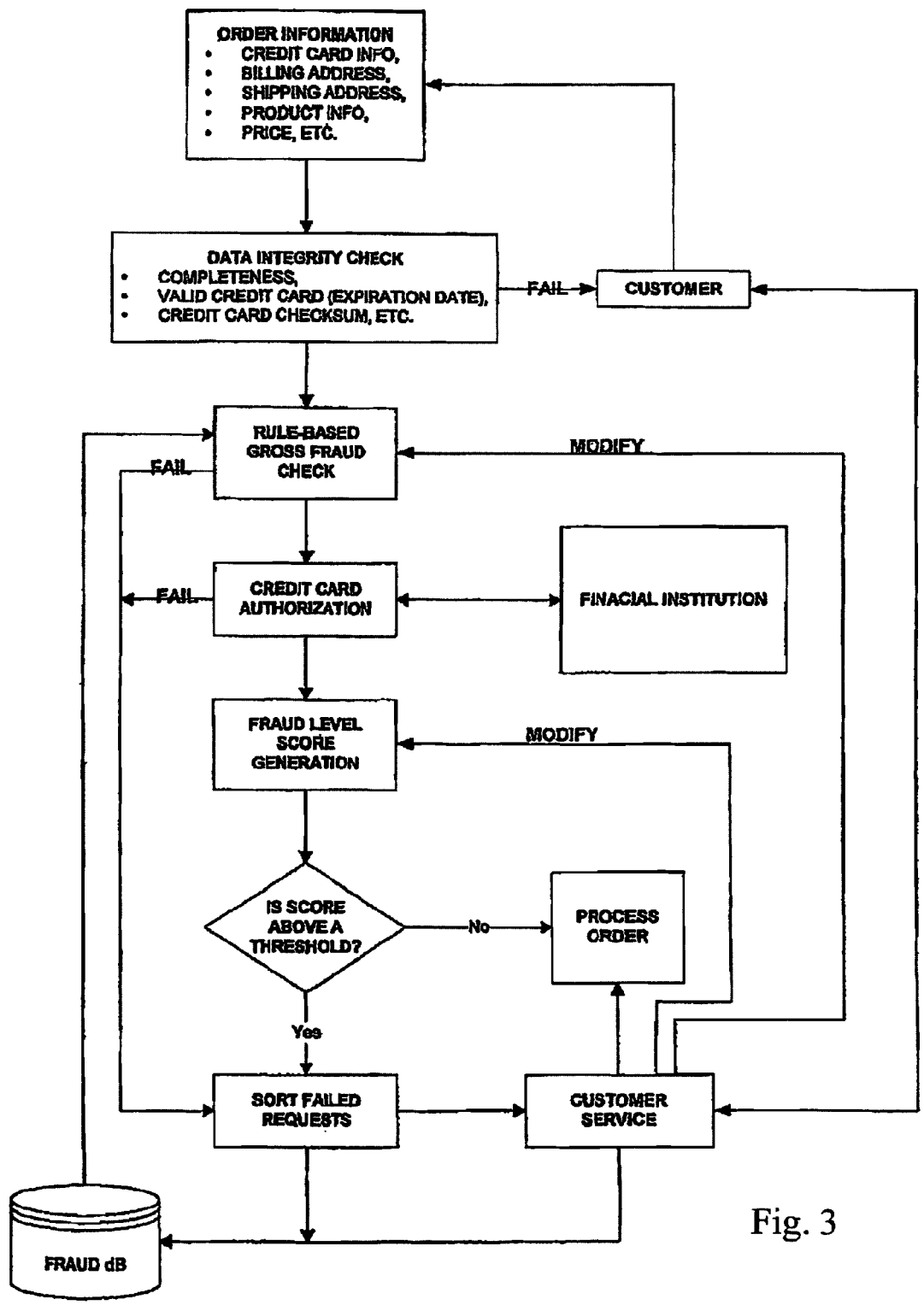
FIG. 3 is a flow diagram showing the fraud processing according to the present invention.
Figure 4:
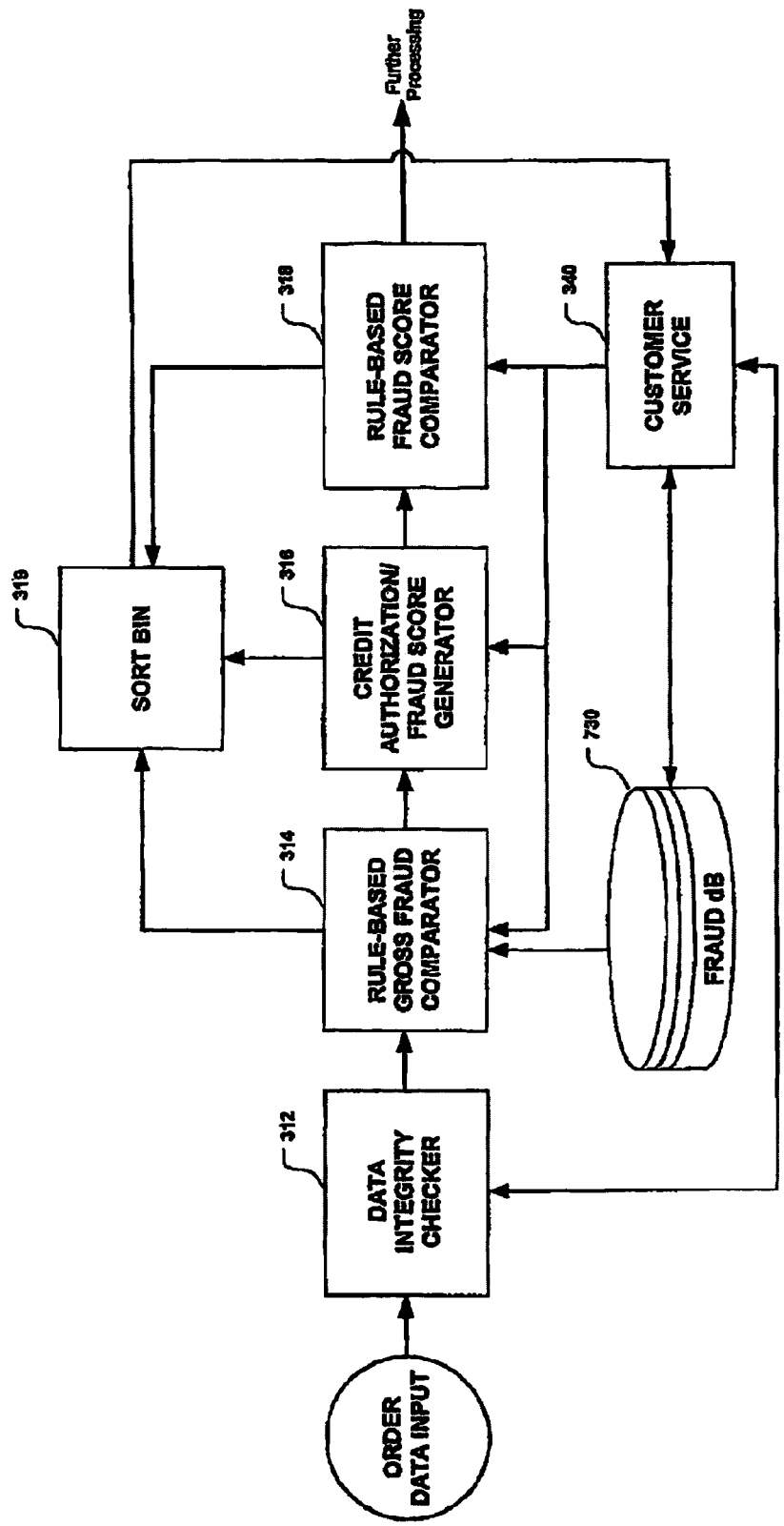
FIG. 4 is a logic block diagram for performing the multi-level fraud processing according to the present invention.

As shown in FIG. 4, the logic blocks of the Fraud Detection sub-system 310 includes a data integrity checker 312, a rule-based gross fraud comparator 314, a credit authorization/fraud score generator 316, and rule-based fraud score comparator 318. The interaction of these logic blocks will be explained with reference to the flow diagram as shown in FIG. 3.

Once the order data is input into the Fraud Detection sub-system 310, the data integrity checker 312 initially performs a data integrity check on the order information for completeness such as billing address information, shipping address information, and method of payment. For example, credit card information is checked to verify that the credit card is not yet expired for credit card purchases. If the data integrity check fails on the order, the customer is notified of the incomplete portions of the order for correction. Once the order passes the data integrity check, the order then proceeds to the gross fraud comparator 314.

Gross fraud check involves searching the Fraud Database 730 internal to the transaction processor 10 of the present invention for history of bad credit by the customer submitting the order. The gross fraud check of the present invention acts as an initial filter for rejecting obvious fraudulent orders such as orders from "black-listed" customers in the Fraud Database 730 with previous histories of bad credit, orders from counties other than the United States under economic crisis, etc. If an order fails the gross fraud check, the order is passed to Customer Service 340 and the customer is immediately notified of the reasons why the order cannot be processed. If, on the other hand, the order passes the gross fraud check, the order is then checked for credit card authorization from a financial institution, such as a commercially available fraud check service and AVS (Address Verification Service).

Based on the information received from the financial institution, a fraud level score, for example, is generated by the credit authorization/fraud score generator 316. The fraud level score is a grading system that indicates the level of risk the order will pose to the business by processing the order. The score is then compared with several predetermined thresholds by the rule-based fraud score comparator 318 and takes different actions based on the comparison to these multiple thresholds. If the score is below the minimal threshold, the order is sent for further processing. If the score is above the maximum threshold, the order is sent into sorting bin 319. The intermediate thresholds allow the order to pass through various intermediate steps while triggering flags for each failed threshold comparison. This allows the failed order to be characterized by several types of failures given a total overall score. The sorting bin 319 of the present invention acts as a buffer to minimize discarded orders. According to the present invention, a dynamic sorting procedure is performed on the rejected orders stored in the sorting bin 319.

The failed orders in the sorting bin 319 are analyzed for reasons why the fraud level score was so high. Failed orders are analyzed for previous purchases by the customer, whether the customer is an account holder, etc. and sorted between high risk and low risk orders. For instance, orders from repeat customers who otherwise have a good history of previous purchases, for example, are low risk orders even though the fraud score is high and orders from customers who have no previous purchase history pose a high risk on defaulting on payments. Subsequently, the sorted orders are either sent to Customer Service 340 to be altered and resubmitted for validation or stored in a list of bad names in the Fraud Database 730 to be used in the gross fraud check of subsequent orders.

Alternatively, if there are generally a high number of failed orders in the sorting bin preventing sales of products, the fraud scores are analyzed and either the rules for generating the fraud score is altered or the thresholds are dynamically modified to reduce the number of orders being rejected. Furthermore, the comparator parameters in the data integrity checker 312 and gross fraud comparator may also be modified based on the results of the rejected orders to optimize order validations. By incorporating multi-level fraud checking system in the manner of the present invention, orders that would otherwise be lost can be recovered thereby increasing business transactions.

Distributor Selection

Once an order has been checked for fraud and passes as a valid order, the products in the order are checked by the Distributor Selection sub-system 330 to determine which distributor will be used to fill the order. The selection of a distributor may be determined by several different methods.

Figure 5:
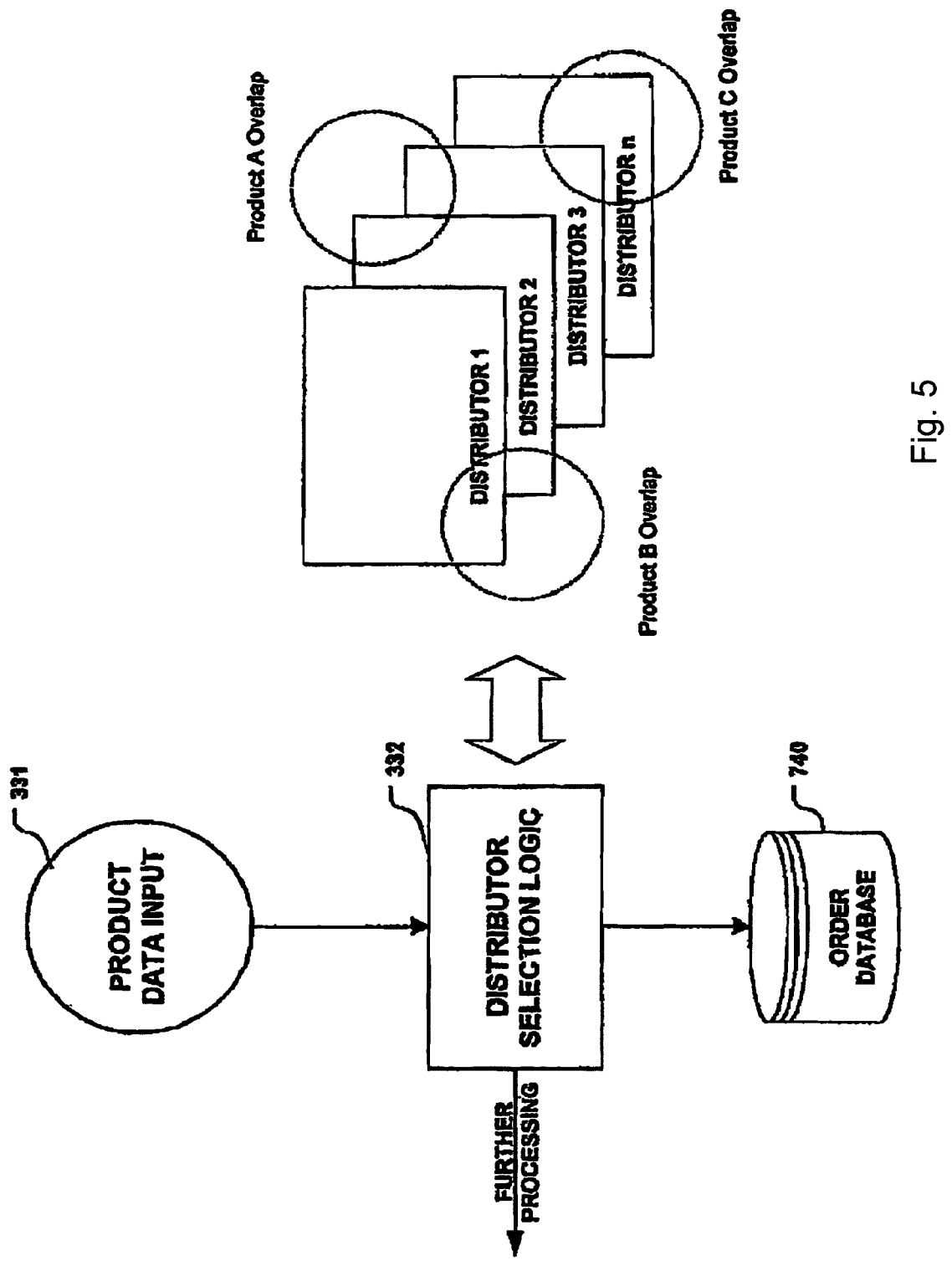
FIG. 5 is a flow diagram showing the distributor selection processing according to the present invention.

Preferably, as shown in FIG. 5, when an order is received by the Distributor Selection sub-system 330, the product information such as the product SKU (i.e., Stock-Keeping Unit) number and quantity is determined from the order and sent to the data input 331. This information is then sent to each of the distributors and the distributors are polled for availability, quantity available by the distributor, and the current price for the product, for example. The information received from each of the distributors are then used by the distribution selection logic 332 to determine which distributor will fill the order. When more than one distributor can fill the order, the product information from each of the available distributors is processed by the distribution logic 332 based on the rule-based algorithm to determine which distributor will be able to best fill the order.

For example, the rules for selecting a distributor may be set to select the distributor providing the product with the maximum profit margin or within a range of margins. Alternatively, the rules may also take into consideration the type of shipping available from the distributor. For instance, if one distributor provides the product with the maximum profit margin but only has ground shipping available that may take weeks for delivery but another distributor provides next-day delivery with a lesser profit margin and the customer indicated speedy delivery, then the second distributor is selected since the first distributor, although providing the maximum profit margin, cannot fulfill the speedy delivery indicated by the customer. In other situations, the Distributor Selection sub-system 330 may be forced to select a particular distributor for a certain product regardless of other factors because of special relations with that particular distributor.

Alternatively, if the connection between some or all of the distributors cannot be established during an ordering processes, the product information stored in the Product Database 720 may be used instead of delaying the processing of the orders. As explained above, the products information is updated preferably three times during a business day. Therefore, although the data in the Product Database 720 is not as accurate as real-time data, the information is generally recent enough to fill the order.

Once a distributor selection is made, the Distribution Selection sub-system 330 forwards the order electronically to the selected distributor to fill the order. The Distributor Selection sub-system 330 then receives verification from the distributor such as customer number, warehouse information, shipment date, invoice amount, shipping cost, tracking number, etc. and stores the order information in the Order Database 740 to make it immediately available to the customer service and the customer's online account.

Credit Card Services

Credit Card Services sub-system 320 receives the orders forwarded to the distributor by the Distributor Selection sub-system 330 and forwards the total cost of the order to the Payment Processing System 40 to be charged to the customer's credit card. Alternatively, if a product has been returned, the Credit Card Services sub-system 320 processes the RMA (i.e., Returned Merchandise Authorization) and sends the request to the Payment Processing System 40 to refund the amount to the customer.

Customer Service sub-system 340 provides a feedback interface between the E-Commerce business using the transaction processor 10 of the present invention with the customers. Customer Service sub-system 340 allows the customer service representatives to access any part of the order processing being performed by the Order Processing System. Customer Service 340 provides the interface into the Order Processing System 30 by handling failed orders, sorted orders from failed orders, customer inquires to order/RMA status, and other customer service issues.

In particular, Customer Service sub-system 340 provides automated feedback to the customer. For instance, once an order has been properly processed, the Customer Service sub-system 340 will send an automated message to the customer with the order information such as customer number, shipment number, tracking number, etc. In cases where orders have failed during the processing period, Customer Service sub-system 340 automatically generates notices to the customer and/or customer service relaying that the order has failed and provides further instructions on how to correct the problem. Additionally, Customer Service sub-system 340 may be programmed to send customers in the Customer Database 710 periodic newsletters, promotional offers, exclusive sales, coupons and incentive, etc. Moreover, this periodic feedback to the customer can be highly personalized based on the information stored in the Customer Database 710 such as the customer's buying patterns.

Payment Processing System

The Payment Processing System 40 receives order/RMA information from the Order Processing System 30 in conjunction with the payment method information. For credit card orders, the Payment Processing System 40 contacts the financial institution issuing the credit card and charge the account holder for purchases or credit the account for processed RMAs. For non-credit card orders, the Payment Processing System 40 may issue bills, receive CODs (i.e., cash-on-delivery) and checks, issue refunds, process wire-transfers, etc. Moreover, the present invention may also take advantage of online leases and loans, a relatively new service in the area of e-commerce.

With respect to the online loans, once a customer is finished shopping with the Online Shopping System 20 of the present invention, the customer applies electronically to a financial institution for a loan. When the loan has been approved, the financial institution sends a loan number and the loan balance limit to the Order Processing System 30. The Payment Processor 40 then proceeds to use the loan number as a credit card number and finishes the transaction be drawing on the approved loan from the financial institution.

With regard to the online lease, once a customer is finished shopping, the customer applies for a lease from a financial institution. When the application is approved, the financial institution sends a lease number to the Order Processing System 30. The Payment Processor 40 then proceeds to use the lease number as a credit card number and finishes the transaction drawing on the approved balance from the leasing institution. The purchase is then shipped directly to the customer, but as with all leases, the leasing institution owns the products.

The transaction processor 10 of the present invention will be described with specific embodiments to more clearly describe the functionality of the present invention. However, equivalent components and obvious modifications within the ability of one with ordinary skill in the art may be used without departing from the scope of the present invention.

The transaction processor 10 of the present invention is built on industry standard equipment including Sun UltraSparc servers, Solaris operating system, Apache Web servers, and Oracle databases. Preferably, each of the systems and sub-systems are installed on a dedicated server running in parallel in a distributed processing architecture.

A customer accesses the Online Shopping System 20 via the company's Web page through a public Web server 110, such as the customer's ISP (i.e., Internet Service Provider). Once on the company's Web page, the customer is issued a unique identification number using various techniques such as using the customer's IP (i.e., Internet Protocol) address, IP host name, personal information, etc. so that others accessing the Online Shopping System 20 do not share each others' shopping information. The customer then browses/searches the Web site (i.e., electronic catalog) for a particular product. The customer selects the product or products and the Online Shopping System 20 places the selected products in an electronic shopping cart.

At the time of checkout, the customer is asked to create a customer account asking for personal information such as name, billing address, telephone number, email address, as well as some profile information (all of which may be optional) to generate a customer account. If the customer already has an account, then the account ID is used to identify the customer and the customer is prompted for their password.

Once a customer account has been established, the order is filled out for the products to be purchased including quantity, method of payment (the credit card number may be established in the customer account so that it does not have to be inputted every time), shipping address, and method of shipment. When the order is completed, the order is passed onto the Order Processing system 30.

The Fraud Detection sub-system 310 performs a data integrity check such as whether each of the required fields of the order form are filled out, checksum test of the credit card number, etc. If the order fails the integrity check, the customer is prompted with an error message requiring to resubmit the order with the corrections. If the order passes the integrity check, then the order undergoes the gross fraud check.

The gross fraud check determines whether the customer has a history of defaulting on payments, whether the credit card number is a valid number, or is ordering from a "blacklisted" location such as Romania or Russia. If the order fails the gross fraud check, the order is sent into a sorting bin. If the order passes the gross fraud check, the order is sent to a commercially available fraud checking service such as CyberSource®. CyberSource® processes the order information and returns a fraud score. The fraud score is then compared to a plurality of predetermined threshold 340 and used in conjunction with other fraud rule based checks. If the order fails, it is placed into the sorting bin. If the order passes, it is sent to the Distributor Selection sub-system 330 for further processing.

As for the orders in the sort bin, the failed orders are sorted between high risk and low risk orders such as whether the order was from an account holder who has good credit history from past purchases, whether the fraud score was too high because the billing address did not match the address of the credit card, etc. The plausible orders are then forwarded to the Customer Service sub-system 340 from which the Customer service representatives either contact the customer to clarify the discrepancies or override the fraud checks and place them into the processing bin to be sent to the Distributor Selection sub-system 330 for further processing. The rest of the failed orders are placed in the Fraud Database 730.

The Distributor Selection sub-system 330 sends the product information (i.e., SKU and quantity) to each of the distributors such as independent pick, pack, and ship distributors and receives information on the products such as availability and cost. The Distributor Selection sub-system 330 forwards this information to the Catalog Builder/Price Modeler 50 and profit margins are calculated. The Distributor Selection sub-system 330 then selects the distributor with, for example, the highest margin or other selected criteria for particular products and forwards the order electronically. Once the distributor fills the order, the Customer Service sub-system 340 receives or retrieves the order information such as the customer number, warehouse number, shipment date, shipment tracking information, invoice amounts, etc.

Customer Service sub-system 340 emails the customer within minutes after a valid order is received with a confirmation number. The Customer Service sub-system 340 emails the customer again when the order is shipped by the distributor or notifies the customer that the product is not available and has been placed on back order.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A computer-implemented method for targeted product offering, the method comprising:
   receiving product data for a plurality of products from a plurality of distributors for the products via a communications network;
   receiving customer data from a plurality of customers, the customer data comprising location information associated with customers, the customer location information derived from an IP address associated with the customer;
   generating, at least in part from the personal information concerning a customer location, at least one user-specific product offering from the plurality of products; and
   sending, by a computer, automated messages comprising the at least one user-specific product offering to the one or more customers.

2. The method of claim 1, wherein the at least one user-specific product offering includes at least of: a coupon, an electronic coupon, a promotional offer, an exclusive sale, an incentive, a rebate, and competitive pricing.

3. The method of claim 1, wherein the product data comprises product description, quantity available and price for each of the products for each of the distributors.

4. The method of claim 1, wherein the customer data comprises at least one of: IP (Internet Protocol) address, IP host name, customer name, billing address, email address and purchase patterns.

5. The method of claim 1, further comprising:
   dynamically adjusting pricing of the product offerings based on at least in part information stored in the database.

6. The method of claim 1, further comprising dynamically adjusting pricing of the product offerings in the electronic catalogs based on a plurality of factors including at least one of: an amount of web-site traffic, sales for a particular category, and sales for a particular product.

7. The method of claim 1, further comprising:
deriving the customer location data from a billing address associated with the customer.

8. A non-transitory computer-readable medium storing a computer program product for, when executed by a processor, performing a method for targeted advertising, the method comprising:
receiving product data for a plurality of products from a plurality of distributors for the products via a communications network;
receiving customer data from a plurality of customers, the customer data comprising location information about customers, the customer location information derived from an IP address associated with the customer;
generating, at least in part from the personal information concerning a customer location, at least one user-specific product offering from the plurality of products; and
sending automated messages comprising the at least one user-specific product offering to the one or more customers.

9. The computer-readable medium of claim 8, wherein the at least one user-specific product offering includes at least of: a coupon, an electronic coupon, a promotional offer, an exclusive sale, an incentive, a rebate, and competitive pricing.

10. The computer-readable medium of claim 8, wherein the data comprises product description, quantity available and price for each of the products for each of the distributors.

11. The computer-readable medium of claim 8, wherein the customer data including customer name, billing address, email address and purchase patterns.

12. The computer-readable medium of claim 8, further comprising dynamically adjusting pricing of the product offerings based on at least in part information stored in the database.

13. The computer-readable medium of claim 8, further comprising dynamically adjusting pricing of the product offerings in the electronic catalogs based on a plurality of factors including at least one of: an amount of web-site traffic, sales for a particular category, and sales for a particular product.

14. The computer-readable medium of claim 8, wherein the plurality of distributors comprise a plurality of individual vendors.

15. A targeted advertising system, the system comprising:
a database to receive product data for a plurality of products from a plurality of distributors for the products via a communications network, the database also receiving customer data from a plurality of customers, the customer data comprising location information associated with customers, the customer location information derived from an IP address associated with the customer;
a communication interface to generate, at least in part from the location information, at least one user-specific product offering from the plurality of products; and
a computer service sub-system to send automated messages comprising the at least one user-specific product offering to the one or more customers.

16. The system of claim 15, wherein the at least one user-specific product offering includes at least of: a coupon, an electronic coupon, a promotional offer, an exclusive sale, an incentive, a rebate, and competitive pricing.

17. The system of claim 15, wherein the product data comprises product description, quantity available and price for each of the products for each of the distributors.

18. The system of claim 15, wherein the customer data comprises at least one of: IP (Internet Protocol) address, IP host name, customer name, billing address, email address and purchase patterns.

19. The system of claim 15, further comprising at least one of:
deriving the customer location data from a billing address associated with the customer.

20. A method for targeted product offering, the method comprising:
receiving, by a computer, product data for a plurality of products from a plurality of distributors for the products via a communications network, the product data comprising data corresponding to identical products for sale by more than one of the distributors;
receiving customer data from a plurality of customers, the customer data comprising location information about customers, the customer location information derived from an IP address associated with the customer;
generating, at least in part from the personal information, at least one user-specific product offering from the plurality of products; and
output the at least one user-specific product offering for display to the one or more customers.

\* \* \* \* \*